No. 737,091. PATENTED AUG. 25, 1903.
H. FELDMEIER.
CHECK CONTROLLED LIQUID DELIVERY APPARATUS.
APPLICATION FILED OCT. 24, 1901.
NO MODEL. 3 SHEETS—SHEET 1.

Harvey Feldmeier Inventor.
By Wilhelm Bonner
Attorneys.

Witnesses:
E. A. Volk.
F. F. Schuyuga.

No. 737,091. PATENTED AUG. 25, 1903.
H. FELDMEIER.
CHECK CONTROLLED LIQUID DELIVERY APPARATUS.
APPLICATION FILED OCT. 24, 1901.
NO MODEL. 3 SHEETS—SHEET 2.
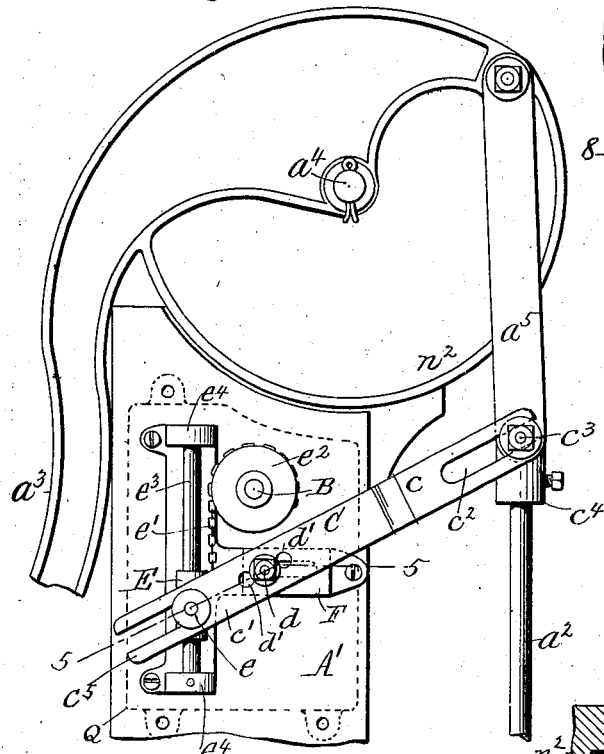
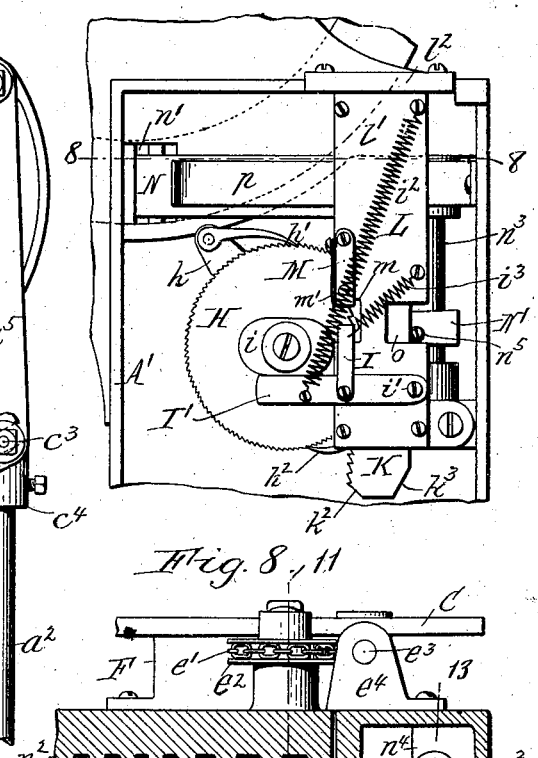
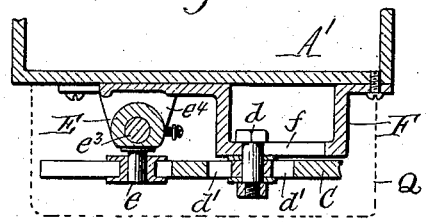
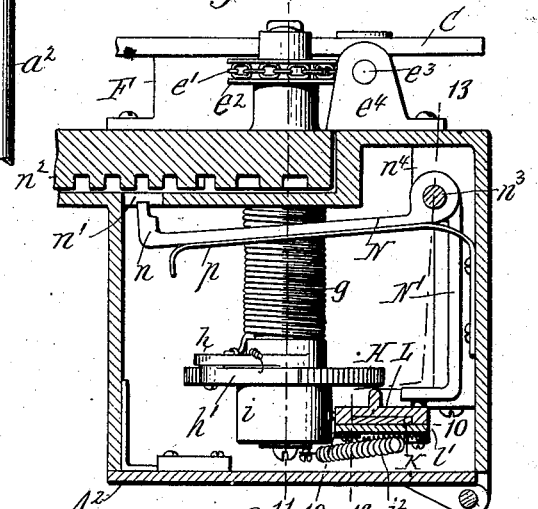
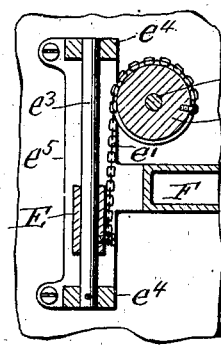
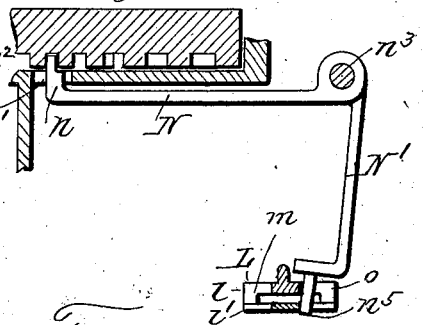
Witnesses:
E. A. Volk.
F. F. Scherzinger.
Harvey Feldmeier, Inventor.
By Wilhelm Bonner, Attorneys.
THE NORRIS PETERS CO., PHOTO-LITHO., WASHINGTON, D. C.

No. 737,091. PATENTED AUG. 25, 1903.
H. FELDMEIER.
CHECK CONTROLLED LIQUID DELIVERY APPARATUS.
APPLICATION FILED OCT. 24, 1901.
NO MODEL. 3 SHEETS—SHEET 3.
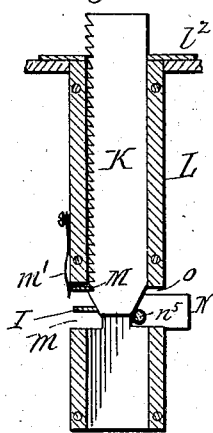
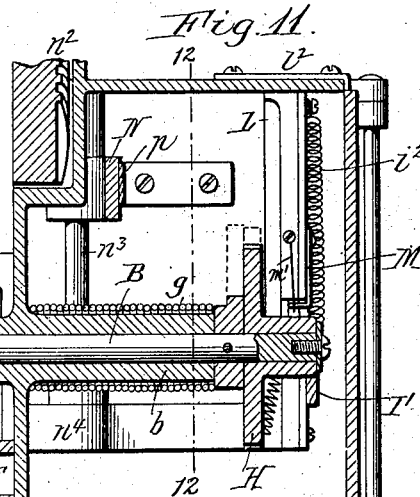
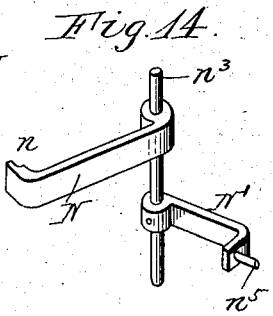
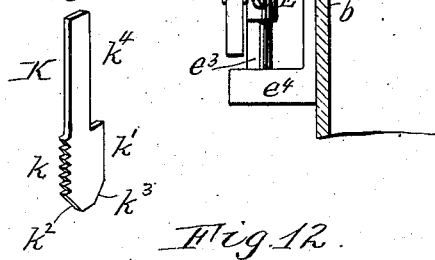
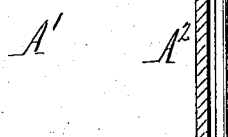
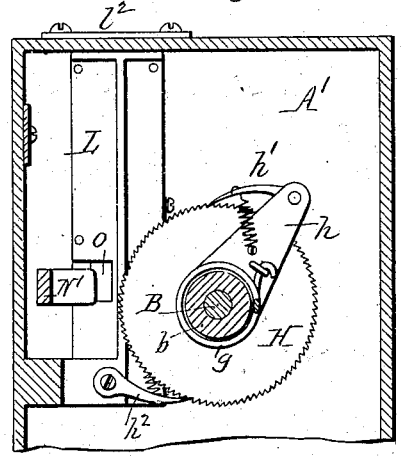
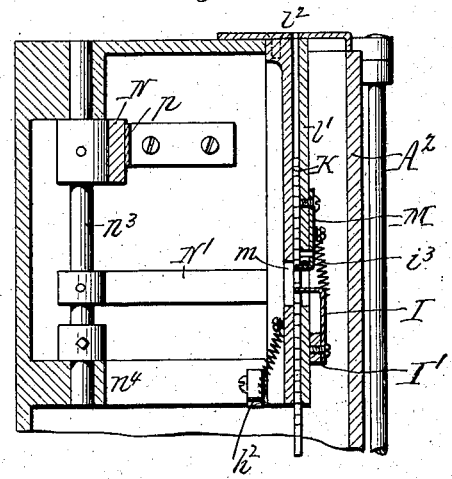
Witnesses:
E. A. Volk
F. F. Scherzinger
Harvey Feldmeier, Inventor.
By Wilhelm Bonner,
Attorneys.
THE NORRIS PETERS CO., PHOTO-LITHO., WASHINGTON, D. C.

No. 737,091. Patented August 25, 1903.

UNITED STATES PATENT OFFICE.

HARVEY FELDMEIER, OF LITTLEFALLS, NEW YORK, ASSIGNOR TO D. H. BURRELL & COMPANY, OF LITTLEFALLS, NEW YORK, A FIRM.

CHECK-CONTROLLED LIQUID-DELIVERY APPARATUS.

SPECIFICATION forming part of Letters Patent No. 737,091, dated August 25, 1903.

Application filed October 24, 1901. Serial No. 79,827. (No model.)

*To all whom it may concern:*

Be it known that I, HARVEY FELDMEIER, a citizen of the United States, and a resident of Littlefalls, in the county of Herkimer and State of New York, have invented new and useful Improvements in Check-Controlled Liquid-Delivery Apparatus, of which the following is a specification.

This invention relates to that class of liquid delivery or dispensing apparatus which embody a pump the action of which is controlled by checks, tokens, or similar devices in such manner that the delivery of liquid begins only after the insertion of a check, token, or other controlling device and is stopped automatically when the value of the check or other controlling device is exhausted and which respond to checks of different values, so that the apparatus will deliver a greater or less volume of liquid in accordance with the greater or less value of the check which is inserted.

The object of this invention is to produce an apparatus which is independent of the unit-delivery of the pump, but depends for the control of the delivery upon the actual distance traveled by the pump-piston, whether greater or less, and in which the ratio which the movement of the check bears to that of the piston can be readily changed, so that the value of the checks or, in other words, the volume of liquid called for by the checks can be readily changed as circumstances may require.

Figure 1:
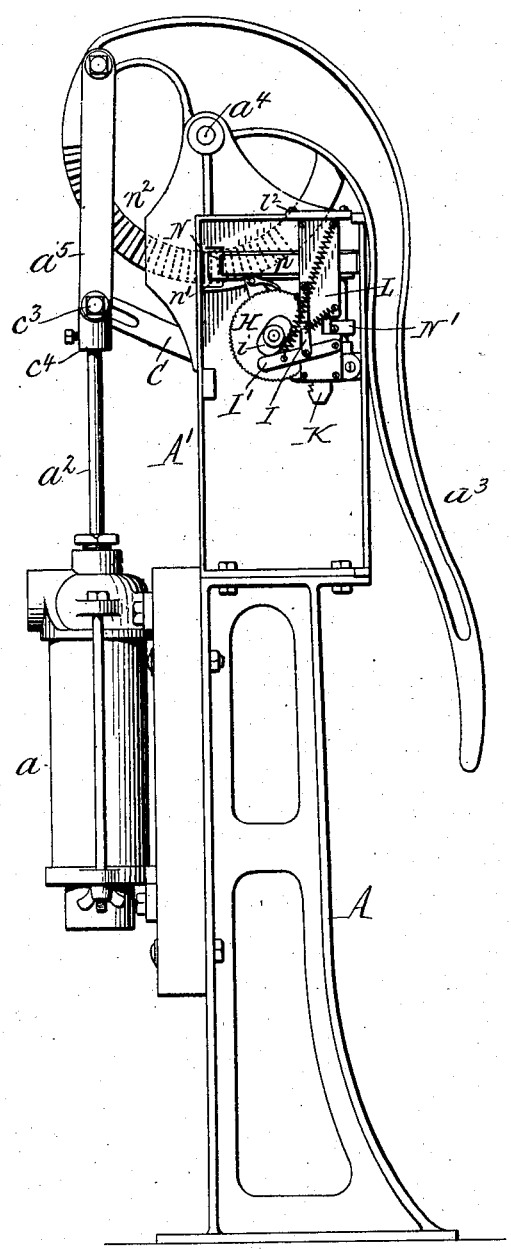
Figure 2:
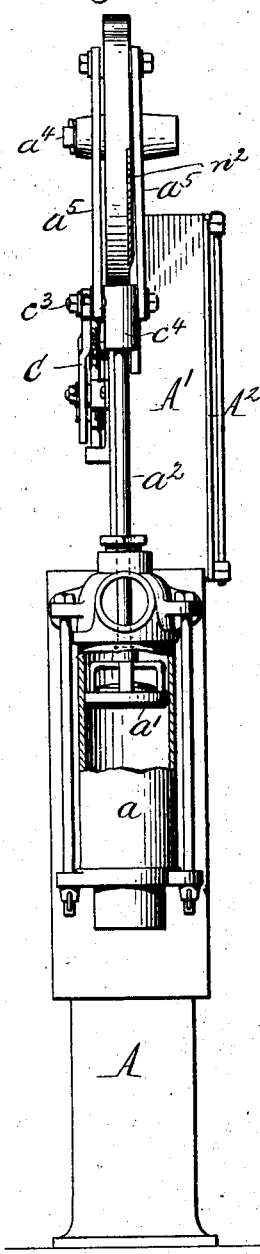
Figure 3:
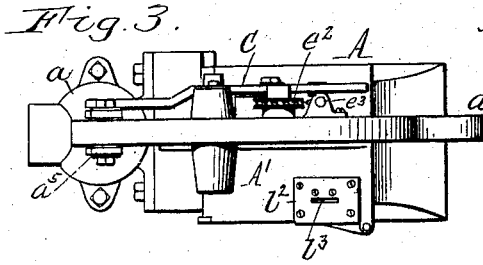

In the accompanying drawings, consisting of three sheets, Figure 1 is a front elevation of a check-pump provided with my improvements, the door of the casing of the check mechanism being removed. Fig. 2 is an end elevation of the pump. Fig. 3 is a top plan view of the same. Fig. 4 is a rear elevation of the upper part of the check-pump on an enlarged scale. Fig. 5 is a horizontal section in line 5 5, Fig. 4, on an enlarged scale through the rock-lever and connecting parts which connect the pump with the check-propelling mechanism. Fig. 6 is a sectional elevation of the chain mechanism connecting the rock-lever with the check-propelling mechanism. Fig. 7 is a front elevation similar to Fig. 1, but on an enlarged scale, of the check-propelling mechanism. Fig. 8 is a horizontal section through the check-propelling mechanism, in line 8 8, Fig. 7, showing the pump-lever unlocked. Fig. 9 is a similar fragmentary section showing the pump-lever locked. Fig. 10 is a vertical sectional elevation of the check-guide and check in line 10 10, Fig. 8. Fig. 11 is a sectional elevation of the check mechanism at right angles to Fig. 7 in line 11 11, Fig. 8. Fig. 12 is a vertical section through the check-propelling mechanism in line 12 12, Fig. 11. Fig. 13 is a vertical section through the casing of the check mechanism, the locking and unlocking arms, and the check-guide in line 13 13, Fig. 8. Fig. 14 is a perspective view of the locking and unlocking arms of the check mechanism. Fig. 15 is a perspective view of a check with short propelling and delivery faces.

Like letters of reference refer to like parts in the several figures.

A represents the upright pump-frame; $a$, the vertical cylinder of a single-acting or lifting pump of any suitable construction secured to said frame in any suitable manner; $a'$, the pump-piston; $a^2$, the piston-rod; $a^3$, the hand-lever by which the piston is actuated and which is pivoted to the top of the frame by a pivot $a^4$, and $a^5$ links which connect the short arm of the hand-lever with the upper end of the piston-rod. The upper part of the frame is formed by a housing $A'$, in which the check-propelling mechanism is supported. This housing also forms the check-till and is provided on its front side with a door $A^2$, which is secured by a suitable lock, so that access can be had only by authorized persons.

The check-propelling mechanism is actuated by a shaft B, which is rotated intermittently forwardly and backwardly in unison with and proportionate to the linear reciprocating movement of the piston. The actual intermittent linear movement of the piston is reproduced on this shaft as a corresponding intermittent rotary back-and-forth movement and is transmitted from this shaft to the check-propelling mechanism and by the latter to the check or other controlling device. This shaft is arranged horizontally in the housing $A'$ and is journaled in a bearing $b$, formed on the rear wall $b'$ of the housing and projecting rearwardly and forwardly therefrom, as most clearly shown in Fig. 11.

The mechanism by which the shaft B of the check mechanism is actuated from the piston is constructed as follows:

C represents a rock-lever, which is fulcrumed on a pivot-bolt $d$ on the rear side of the casing A' and which has a long arm $c$ connected with the piston-rod by any suitable means, so that the lever is oscillated by the reciprocating movement of the piston, and a short arm $c'$, by which the shaft B is actuated. As shown in the drawings, the long arm of the lever is provided with a bifurcated end $c^2$, which engages the bolts $c^3$, by which the lower ends of the links $a^5$ are connected with the head $c^4$ of the piston-rod. The short arm $c'$ of the lever is provided with a bifurcated end $c^5$, which engages a bolt $e$ on a vertically-reciprocating sleeve or head E, which is connected by a chain or other flexible connection $e'$ with a drum $e^2$ on the rear end of the shaft B, Figs. 4, 5, 6, 8, and 11. The sleeve or head E slides up and down on a rod $e^3$, secured in lugs $e^4$ on a frame $e^5$, which is secured to the rear side of the casing A'. The sleeve or head may, however, be guided in any other suitable manner.

The rock-lever C is provided with any suitable means for changing the relative length of its two arms, so that the ratio of motion which is produced at the short arm of the lever and communicated from the latter to the check-propelling mechanism can be increased or reduced. Two different means for changing the ratio of motion are shown in the drawings, Figs. 4 and 5, and both can be used conjointly in the same apparatus. One of these means consists of several pivot-holes $d'$, formed in the lever in such manner that either hole may be engaged with the pivot-bolt $d$. These holes are so located or spaced that they produce certain desired different ratios of movement. Another means for changing the ratio of movement consists of a horizontal slot $f$, formed in the bracket F, in which the pivot-bolt $d$ of the rock-lever is adjustably secured. By shifting the pivot-bolt in this slot the leverage can be nicely adjusted. The several pivot-holes $d'$ provide an adjustment to certain predetermined positions of the lever and corresponding ratios of movement, and the slot $f$ provides a fine adjustment intermediate of or irrespective of these fixed positions and ratios.

The chain $e'$ extends from the sleeve E upwardly and over the peripheral face of the drum $e^2$, to which the end of the chain is secured, so that the downward movement of the short rear arm of the lever and of the head E unwinds the chain from the drum $e^2$ and turns the latter and the shaft B in the direction of the arrow in Fig. 4. During the upward movement of the rear arm of the lever the drum and shaft are turned in the opposite direction and the chain is wound upon the drum by any suitable return device—for instance, a spring $g$, Figs. 8 and 11—which is coiled around the shaft in the casing A' and connected at one end with the shaft and at the other with the casing.

$h$ represents a pawl-arm which is secured to the shaft B near the front end thereof and which carries a pawl $h'$. The latter engages with a ratchet-wheel H, which is mounted loosely on the shaft B in front of the pawl-arm and which receives an intermittent rotary motion from the pawl $h'$ and is held against backward movement by a detent-pawl $h^2$.

$i$ represents actuating arms, cams, or projections formed on the ratchet-wheel for actuating a pawl I, by which the check K or other token or delivery-controlling device is propelled.

The checks used in this apparatus are strips or flat bars of metal having on one of the longitudinal edges a propelling-face $k$, provided with a series of ratchet-teeth with which the propelling-pawl I engages, Figs. 7, 10, and 15, and at the opposite edge a plain back $k'$, which forms the delivery-face of the check.

$k^2$ $k^3$ represent beveled faces formed on the front end of the check, the beveled face $k^2$ leading to the toothed propelling-face $k$ and the beveled face $k^3$ to the delivery back or face $k'$.

L represents the check-guide, which has the form of a flat rectangular tube extending downwardly from the top plate of the casing A' on the front side of the ratchet-wheel H, and on one side of the center thereof, Figs. 1, 7, 8, 10, 11, and 13. This check-guide is preferably formed by a channeled bar $l$ and a front plate $l'$, which latter covers the channel of the bar. The upper end of the check-guide is preferably covered as a finish by a face-plate $l^2$, which has a slot $l^3$ for the insertion of the check.

I', Figs. 7 and 12, is a rock-lever which is pivoted to the front plate of the check-guide at $i'$ and which extends underneath the actuating-arm $i$ and is depressed by the latter. The propelling-pawl I is pivoted to this rock-lever and extends upwardly from the same and projects with its tooth or head into the check-guide through a notch $m$. The propelling-pawl is drawn toward the toothed propelling-face of the check by a spring $i^3$. The rock-lever I' is pressed upwardly against the actuating-arm by a spring $i^2$, which is attached at its upper end to the check-guide.

M is a detent-pawl which is pivoted to the check-guide above the notch $m$ and which has its head or tooth arranged in this notch above the head of the propelling-pawl. This detent-pawl is pressed toward the check by a spring $m'$.

The hand-lever by which the pump is actuated is locked against movement in the normal position of the parts by a locking-arm N, which is arranged in the housing A' and which projects with its head $n$ through an opening $n'$ in the rear wall of the housing into engagement with a toothed segment $n^2$, formed on the locking-lever concentric with the pivot thereof, Figs. 7, 8, 9, 13, and 14. This locking-arm is secured to the upper end of a vertical rock-shaft $n^3$, which is journaled in bearings $n^4$, formed on the inner side of the casing A'. N' represents an unlocking-arm, which is secured to the same rock-shaft below the locking-arm and which is provided at its end with a pin $n^5$, which projects into a notch $o$, formed in that edge of the check-guide, against which the delivery face of the check bears. The teeth on the segment $n^2$ are arranged on the front side of the segment, which faces the rear wall of the housing A', so that the head of the locking-arm N is concealed by the segment. The locking-arm is held yieldingly in engagement with the segment and the unlocking-arm within the unlocking-notch $o$ in the path of the check by a suitable spring. As shown in the drawings, a spring $p$ is secured for this purpose to the inner side of the casing, so as to bear against the front side of the locking-arm and hold the arm against the toothed segment and the unlocking-arm in the notch $o$ of the check-guide, as shown in Figs. 8 and 9. In the normal position of the parts the pump-lever is locked against movement in either direction by the locking-arm M, as shown in Fig. 9, and the unlocking-arm N' projects with its end or pin $n^5$ into the unlocking-notch $o$ of the check-guide and stands in the path of the check, as represented in Figs. 9 and 10. The propelling-pawl I and the detent-pawl M stands with their heads in the notch $m$ of the check-guide, as shown in Fig. 10. For operating the pump the check is inserted in the check-guide and pushed down in the same until the upper end of the check is flush with the face-plate $l^2$. The checks are made of such length that when the check has been so inserted its beveled front face $k^2$ has passed by the propelling-pawl I and has swung the same sidewise sufficiently to engage the pawl with the first tooth of the propelling-face $k$ of the check, and the beveled front face $k^3$ has swung the unlocking-arm N' sidewise a sufficient distance to withdraw the locking-arm N from the locking-segment. The pump-lever is now free to be operated and is worked in any convenient way, making full strokes or partial strokes, as the operator may desire. The oscillating movement of the pump-lever causes an intermittent progressive rotation of the ratchet-wheel H, each movement of the ratchet-wheel being proportionate to the effective movement of the piston. The progressive intermittent movement of the ratchet-wheel produces a corresponding progressive forward movement of the check in the guide, but on a greatly-reduced scale. In the check-propelling mechanism shown in the drawings the actuating-arm $i$ of the ratchet-wheel is duplicated on diametrically opposite sides of the wheel, whereby the rock-lever I', which carries the propelling-pawl I, is caused to make two effective strokes for each revolution of the ratchet-wheel. When but one actuating-arm is employed, but one stroke of the propelling-pawl is made for each revolution of the wheel, and when more than two arms are employed a correspondingly greater number of propelling strokes are made. The check is propelled in this manner by a succession of downward movements through the check-guide until the propelling-pawl reaches the upper end of the toothed propelling-face of the check, which end is preferably on a level with the upper end of the plain back or delivery-face of the check. When the propelling-pawl has made the downward stroke in engagement with the last tooth of the propelling-face of the check, the pin $n^5$, at the end of the unlocking-arm N', clears the upper end of the delivery-face and moves inwardly under pressure of the spring $p$, thereby engaging the locking-arm N with the locking-segment, whereby the pump is locked against further movement until another check is inserted. The spent check remains in the lower part of the check-guide with its propelling and delivery faces below the head of the propelling-pawl and the pin of the unlocking-arm and is pushed out of the guide by the insertion of the next following check. The propelling and delivery faces of the checks are made of greater or less length, according to the desired value of the check. When these faces are shorter than the required length of the check, the latter is provided above these faces with an extension $k^4$, Fig. 15, of proper length and so narrow that it does not come in contact with the pawls and unlocking-arm.

The rear portion of the rock-lever C and the chain mechanism connecting the same with the oscillating or rock shaft B are preferably covered by a casing Q, which is indicated by dotted lines in Figs. 4 and 5.

In my improved apparatus the progressive movement of the check is proportionate to the distance traversed by the piston or displacement member of the pump, and the delivery is therefore controlled with reference to the actual volume of liquid which has been delivered by the movement of the piston and not with reference to the number of strokes which the piston has performed. The check or other delivery-controlling device is propelled proportionately to the distance traveled by the piston or other displacement member of the pump, whether such piston or member travels the full distance of its movement or only a fraction thereof. The holder of the check is thereby enabled to procure the full volume of liquid called for by the check without reference to the length of the piston-stroke and can take long or short strokes in working the pump, as may be most convenient. The ratio which the movement of the check bears to that of the piston, and consequently the delivery value of the check, can be readily changed by simply adjusting the rock-lever C as described without interchanging any parts or introducing any new parts. By this means the delivery value of the check is changed without changing the stroke of the piston, thereby retaining the full delivery capacity of the pump at a full stroke under all the different values which may be given to the check. In the apparatus illustrated and described herein the delivery is stopped by locking the pump against further movement. This means of stopping the delivery is very satisfactory; but other means may be resorted to, and I do not wish to limit myself to this particular means.

The check-propelling mechanism and the mechanism for transmitting the piston movement to the check-propelling mechanism herein described and shown are very satisfactory in their operation and are preferred; but these mechanisms may nevertheless be modified in various ways without departing from the essence of my invention.

I claim as my invention—

1. The combination of a reciprocating-piston pump, a propelling mechanism for a check or other controlling device, intermediate lever mechanism whereby the check-propelling mechanism is connected with the pump-piston and actuated proportionately to the distance traveled by the piston during any series of piston movements of the same or varying lengths, and means for adjusting the leverage of the intermediate mechanism and thereby the ratio of movement between the piston and the check-propelling mechanism, substantially as set forth.

2. The combination of a piston-pump, a propelling mechanism for a check or other controlling device, transmitting mechanism containing an actuating-lever which has one arm connected with the piston and moves in unison therewith and which actuates the check-propelling mechanism by its other arm proportionate to the travel of the piston, and means for changing the leverage and the ratio of movement produced thereby in the check-propelling mechanism, substantially as set forth.

3. The combination of a pump having a reciprocating piston, a rock-lever which is actuated proportionate to the reciprocating movement of the piston, means for changing the leverage of said lever, a rock-shaft which is actuated from said lever, and a propelling mechanism for a check or other controlling device which is actuated from said rock-shaft, substantially as set forth.

4. The combination of a pump having a reciprocating piston, a rock-lever which is actuated proportionate to the reciprocating movement of the piston, means for adjusting said lever on its pivot to change the leverage, a rock-shaft which is actuated from said lever, and a propelling mechanism for a check or other controlling device which is actuated from said rock-shaft, substantially as set forth.

5. The combination of a pump having a reciprocating piston, a rock-lever which is actuated proportionate to the reciprocating movement of the piston, means for adjusting the pivot of the lever to change the leverage, a rock-shaft which is actuated from said lever, and a propelling mechanism for a check or other controlling device which is actuated from said rock-shaft, substantially as set forth.

6. The combination of a pump having a reciprocating piston, a rock-lever having one arm connected with the piston and moving therewith, a reciprocating head connected with the other arm of said lever, a rock-shaft connected with said head by a flexible connection which turns the shaft in one direction, a return-spring which turns the shaft in the opposite direction, and a propelling mechanism for a check or other controlling device actuated from said rock-shaft, substantially as set forth.

7. In a check-controlled pump, the combination of a reciprocating piston whereby the liquid is displaced, a means for propelling a check or other controlling device, an actuating mechanism for said propelling means, said actuating mechanism containing a rotary member which is rotated to represent the total displacement of the piston during a series of piston movements of the same or varying lengths, a lever mechanism interposed between said rotary member and said piston, and means for changing the leverage of said mechanism, substantially as set forth.

8. In a check-controlled pump, the combination of a reciprocating piston whereby the liquid is displaced, a reciprocating pawl for propelling a check or other controlling device, and an actuating mechanism for said pawl containing a wheel which is rotated to represent the total displacement of the piston during a series of piston movements of the same or varying lengths, substantially as set forth.

9. In a check-controlled pump, the combination of a reciprocating piston whereby the liquid is displaced, a reciprocating pawl for propelling a check or other controlling device, an actuating mechanism for said pawl containing a wheel which is rotated to represent the total displacement of the piston during a series of piston movements of the same or varying lengths, and a speed-varying device interposed between said wheel and said piston, substantially as set forth.

10. The combination of a piston-pump, a rock-shaft, means for turning said shaft back and forth proportionate to the travel of the piston, an actuating-pawl on said rock-shaft, a ratchet-wheel actuated by said pawl, and a propelling-pawl adapted to engage a check or other controlling device and actuated by a projection on said ratchet-wheel, substantially as set forth.

11. The combination of a piston-pump, a rock-lever which is connected with the piston and moves in unison therewith, a rock-shaft which is actuated by said lever, a pawl mounted on said rock-shaft, a ratchet-wheel actuated by said pawl, a rock-arm actuated by said ratchet-wheel, and a check-propelling pawl carried by said rock-arm, substantially as set forth.

12. The combination of a pump, a pump-lever provided with a toothed segment, a check-guide, an elbow-lever composed of a locking-arm adapted to engage said segment and an unlocking-arm projecting into the check-guide, and a check-propelling mechanism, substantially as set forth.

Witness my hand this 22d day of October, 1901.

HARVEY FELDMEIER.

Witnesses:
  WILLIAM PARSONSON,
  GRIFFITH PRICHARD.